(12) United States Patent
Hombert

(10) Patent No.: US 10,889,043 B2
(45) Date of Patent: Jan. 12, 2021

(54) DEVICE AND METHOD FOR CLEANING AN EXTRUDER FOR ELASTOMER MIXTURES

(71) Applicant: COMPAGNIE GENERALE DES ETABLISSEMENTS MICHELIN, Clermont-Ferrand (FR)

(72) Inventor: Christophe Hombert, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 254 days.

(21) Appl. No.: 15/742,173

(22) PCT Filed: Jul. 18, 2016

(86) PCT No.: PCT/EP2016/067085
§ 371 (c)(1),
(2) Date: Jan. 5, 2018

(87) PCT Pub. No.: WO2017/013080
PCT Pub. Date: Jan. 26, 2017

(65) Prior Publication Data
US 2018/0194054 A1 Jul. 12, 2018

(30) Foreign Application Priority Data

Jul. 17, 2015 (FR) ...................... 15 56801

(51) Int. Cl.
*B29C 48/265* (2019.01)
*B29C 48/25* (2019.01)
(Continued)

(52) U.S. Cl.
CPC .......... *B29C 48/2562* (2019.02); *B29B 7/805* (2013.01); *B29C 48/265* (2019.02);
(Continued)

(58) Field of Classification Search
CPC ... B29F 3/10; B29B 7/66; B29C 43/22; B29C 48/16; B01F 13/10; B01F 13/00; B01F 7/08; B01F 48/272; B01F 48/2566
See application file for complete search history.

(56) References Cited

U.S. PATENT DOCUMENTS 3,632,142 A * 1/1972 Ichihara ................ F16L 37/113
285/88
3,833,247 A * 9/1974 Puskas .................... B29C 48/30
285/414
(Continued)

FOREIGN PATENT DOCUMENTS

CN 202727300 * 7/2012 ............ B29C 47/12
CN 102762356 A 10/2012
(Continued)

OTHER PUBLICATIONS

Oct. 20, 2016 International Search Report and Written Opinion in International Patent Appln. No. PCT/EP2016/067085.

*Primary Examiner* — Matthew J Daniels
*Assistant Examiner* — Shibin Liang
(74) *Attorney, Agent, or Firm* — Venable LLP

(57) ABSTRACT

A device for cleaning an extruder includes a frame that supports a screw and a barrel. When driven by a driver, the screw is rotatable about a longitudinal axis of the barrel. The barrel includes a feed inlet and an outlet that opens directly into an extrusion die mounted on a support. The frame is translationally movable relative to the die and the support in a direction parallel to the longitudinal axis between a first position, in which the barrel and the die are in sealed contact, and a second position, in which the barrel is moved away from the die in order to allow cleaning to be performed. The device also includes an automatic coupling mechanism that enables quick locking and unlocking of the barrel and the (Continued)

die, so that the frame can move between the first and second positions when the barrel and the die are unlocked.

11 Claims, 3 Drawing Sheets

(51) Int. Cl.
 *B29C 48/27* (2019.01)
 *B29B 7/80* (2006.01)
 B29C 48/03 (2019.01)
 B29K 21/00 (2006.01)
 B29B 7/74 (2006.01)

(52) U.S. Cl.
 CPC ........ *B29C 48/272* (2019.02); *B29C 48/2715* (2019.02); *B29B 7/7495* (2013.01); *B29C 48/03* (2019.02); *B29C 48/266* (2019.02); *B29K 2021/00* (2013.01)

(56) References Cited

U.S. PATENT DOCUMENTS

| | | | |
|---|---|---|---|
| 3,895,898 A * | 7/1975 | Theysohn | B29C 43/24 425/325 |
| 4,799,874 A | 1/1989 | Bellmer et al. | 425/131 |
| 5,908,642 A | 6/1999 | Veen et al. | 425/183 |
| 8,794,949 B2 * | 8/2014 | Simpson | B29C 48/30 425/145 |
| 9,718,231 B2 | 8/2017 | Simpson et al. | |
| 2004/0212124 A1 * | 10/2004 | Ishikawa | B29C 48/30 264/210.2 |
| 2012/0294971 A1 | 11/2012 | Simpson et al. | |
| 2014/0314899 A1 | 10/2014 | Simpson et al. | |

FOREIGN PATENT DOCUMENTS

| | | |
|---|---|---|
| DE | 36 38 623 C1 | 10/1987 |
| DE | 195 09 375 A1 | 9/1996 |
| EP | 0 403 164 A1 | 12/1990 |
| EP | 1 552 914 A1 | 7/2005 |
| FR | 2 189 187 | 1/1974 |
| FR | 2 889 818 A1 | 2/2007 |
| JP | 2005-324395 A | 11/2005 |
| WO | WO 2010/105682 A1 | 9/2010 |
| WO | WO 2013/030226 A2 | 3/2013 |
| WO | WO 2015/032381 A2 | 3/2015 |

\* cited by examiner

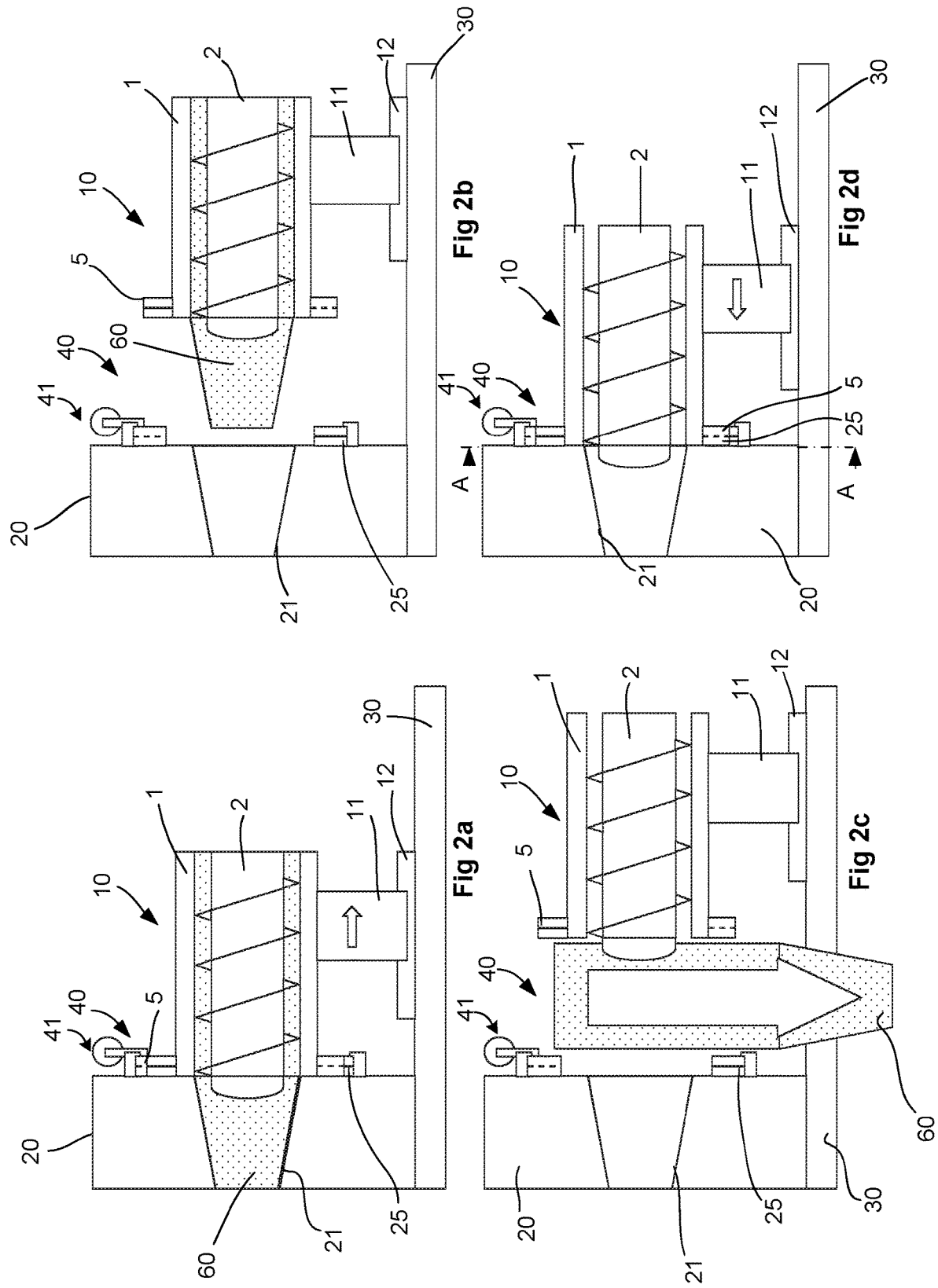

DEVICE AND METHOD FOR CLEANING AN EXTRUDER FOR ELASTOMER MIXTURES

FIELD OF THE INVENTION

The invention relates to the field of the extrusion of elastomer mixtures more particularly intended for the manufacture of tires.

RELATED ART

As is known, the manufacture of the profiled elements based on rubber mixtures that are used in the building of tires calls for extruders the purpose of which is to produce strips of rubber with a determined profile. These extruders are made up mainly of a fixed barrel and of an extrusion screw capable of rotating inside the barrel.

The shape of the barrel, that of the screw, and the arrangement thereof are such that rotating the screw has the effect of applying mechanical work to the mixture with a view to increasing the fluidity thereof, on the one hand, and of propelling said mixture towards an extrusion die with a view to conferring a determined profile on the extruded product, on the other hand. The extrusion die is generally formed of a fixed nozzle or of the gap between a fixed profiled blade and a rotary roller or between two rotary rollers rotating in opposite directions. The continuous strip leaving the extrusion apparatus may be wound onto storage means for later use or fed directly to a tyre building device situated downstream.

At the end of the extrusion operation, the extruder has to be completely emptied particularly so that it can be fed with a different mixture. This operation is often performed manually by the operator who cleans out the inside of the extruder after having tipped back the roof thereof. This manual operation is painstaking and time-consuming.

Document EP 0 403 164 provides a solution to the problem of manual cleaning of an extruder and proposes an apparatus comprising gripper jaws for removing the residual solid material from the extrusion head, means for moving the jaws along a horizontal rail to remove the residual material extracted and means for clearing this material away when the jaws reach the removal position. Admittedly, this solution does allow automatic cleaning of the extrusion head, but at the expense of a fairly complex ancillary installation.

Document JP 2005324395 describes another installation for cleaning an extruder which is connected to a gear pump via an intermediate zone, the intermediate zone communicating with an actuating cylinder the pushrod of which is perpendicular to the longitudinal axis of the extruder and is created in such a way as to apply a force to the volume of rubber in the intermediate zone in order to remove it via an adjacent discharge valve. The installation of that document also calls for additional means of the scraper and discharge valve type, which make the installation overall complex. This installation does not allow the emptying of the extrusion head which therefore has to be removed and cleaned.

Also known, from document FR 2889818 is an extruder in which the barrel and the die form an assembly which is mounted with translational mobility with respect to the extrusion screw with a view to adjusting the position of the screw with respect to the die. Screw maintenance operations can be performed when the screw is completely clear of the barrel. However, moving the barrel and die assembly in a translational movement calls for actuating means comprising two actuating cylinders working in opposition and, in addition, control means for controlling and regulating the position of the screw must also be provided. Such a solution makes the extruder expensive and complex to construct.

Document EP 1552914 proposes, in a similar way to the previous one, separating the screw from the barrel of the extrude, but this time with a view to cleaning the extruder. The extruder in this document is designed to feed a rubber profiled element to two adjacent horizontal calendering rollers supported by a common frame which at the same time supports the barrel of the extruder. More particularly according to that document, in order to access the inside of the extruder, the common frame is moved along a horizontal rail by operating a hydraulic actuating cylinder in order to move the barrel away from the extrusion screw, and then the frame that supports the two calendering rollers is moved along a second horizontal rail parallel to the first in order to move the barrel away from the calendering rollers. This already entails fitting the ends of the barrel with two removable sealing devices and providing a double movement system, one for moving the barrel and the other for moving the common frame. Such a solution exhibits weaknesses in terms of the sealing of the barrel and requires movement systems that are complicated and, furthermore, cause the hydraulic actuating cylinder to experience heavy loads.

Document WO 2010/105682 is also known and describes a system comprising, arranged in series, an extruder, a gear pump and an outlet nozzle. That document proposes a solution for cleaning the gear pump by making the pump housing in two parts and by moving one part of the pump housing with certain of its components axially with respect to the others. This solution admittedly does allow the pump to be cleaned, but does not allow the cleaning of the extruder, or of the roof situated before the outlet nozzle.

Document FR 2189187 proposes a solution for cleaning the injection head of the system comprising an extruder and an injection head delivering into a calendering machine. In order to do that, the injection head is made in two parts: it therefore comprises two half-heads coming together at a radial parting line. The half-heads are locked together in the work position. During cleaning, the upper half-head moves axially with the extruder whereas the lower half-head is immobile, being secured to the bed of the machine. Several individual closure means are provided in the upper part in order to ensure sealing at the parting line. However, such a setup with the extruder and upper half-head mounted cantilever fashion proves to be detrimental to the sealing of the system. This is because the significant closure forces are reacted on the lower half-head and ultimately cause peening of the contacting faces and therefore risk of leakage at the parting line. The system is therefore not reliable over time, and still remains complex.

BRIEF DESCRIPTION OF THE INVENTION

It is an object of the invention to alleviate at least one of the disadvantages of the documents described herein and to propose a device and a method for cleaning an extruder and the outlet die thereof, the extruder being intended to operate with different elastomeric mixtures so that it is possible quickly to change mixture without moreover making its structure complex.

This objective is achieved with a device for cleaning an extruder intended to operate with elastomeric mixtures comprising a frame supporting a screw and a barrel, the screw being made to rotate about the longitudinal axis X-X' of the barrel when it is rotationally driven by drive means, the barrel comprising an elastomeric-mixture feed inlet and an outlet opening directly into an extrusion die mounted on a support, characterized in that the frame is mounted with the ability to move translationally with respect to the die support in a direction parallel to the longitudinal axis X-X' between a first position in which the barrel and the die are in sealed contact to allow the elastomeric mixture to pass through the die and a second position in which the barrel is moved away from the die in order to perform cleaning, the parting line between the barrel and the die being substantially axisymmetric with respect to the axis X-X' and in that the said device comprises an automatic coupling mechanism for quickly locking and unlocking the barrel and the die and allowing the frame to move between the two positions.

The device for cleaning an extruder according to the invention therefore comprises a frame which forms a support for the barrel, the extrusion screw and the means of driving the latter in rotation relative to the barrel. According to the invention, the frame is mounted with the ability to move translationally with respect to an extrusion die situated in the vicinity of the downstream end of the barrel, the extrusion die being mounted on a fixed support of the device and the barrel closing onto the die along a parting line which is substantially axisymmetric with respect to the axis X-X'. What is meant by a parting line is the plane along which the barrel and the die separate and then meet as the frame is moved axially. Specifically, the axial movement of the frame allows the barrel to be pressed firmly against the die to provide sealing between these two in the same direction as the direction of movement. The device also comprises an automatic coupling mechanism which allows the barrel to be locked quickly onto the die support in the work position of the extruder and to be quickly unlocked in order to allow the barrel to be moved away from the die for cleaning of the extruder. Thus, when the barrel and the die meet along an axisymmetric parting line, the closure forces are distributed symmetrically with respect to the axis of the extruder for better sealing at the join. What is more, that allows optimum cleaning both of the extruder and of the extrusion die.

According to other advantageous features of the invention:

The automatic coupling mechanism comprises a locking device produced in such a way that the locking forces are distributed uniformly over the circumference of the barrel; as the locking forces are thus uniformly distributed over the circumference, the sealing obtained is better and more reliable over time;

The automatic coupling mechanism comprises a system of the screw-nut type comprising a first ring surrounding the barrel and collaborating with a second ring secured to the support and surrounding the die and a mechanism for turning the screw or the nut; that allows the coupling system to provide quick axial attachment and, at the same time, to provide the locking force that also takes up axial clearances, for example those due to manufacturing tolerances or due to wear. This mechanism makes it possible to considerably demultiply the load of the actuator so as to be able to use actuators of the electric actuating cylinder type. What is more, an actuator of the fine-pitch electric actuating cylinder type is chosen in order to improve the demultiplication and the positional accuracy;

The first ring comprises inclined ramps; it is coaxial with the second ring which is secured to the outlet end of the barrel and comprises inclined ramps which are made to collaborate with the inclined ramps of the first ring. The inclination of the ramps follows a helix wound around the axis X-X'. Thus, the locking forces are uniformly distributed over the entire circumference of the barrel making it possible to have a very good sealing between the barrel and the die support, especially for high values of the working pressure inside the extruder (around 200 bar);

The inclined ramps of the said first and second rings are produced in the form of a plurality of tenons uniformly distributed on the circumference of each ring, the tenons of one ring being able to slide axially in the spaces between the tenons of the other ring. The tenons thus constitute a plurality of threads uniformly distributed about the circumference of each ring, their geometry allowing them to engage and lock by rotation of one ring with respect to the other, and then to disengage and slide axially;

The rotational-drive mechanism comprises a latch lock lever device connecting one of the rings in an articulated manner to the rod of a translational-actuation actuating cylinder. This latch lock lever mechanism makes it possible to demultiply the clamping force applied to the ring during locking. Moreover, at least one of the links of the latch lock lever is adjustable lengthwise so as to optimize the angle of closure in order to greatly demultiply the force;

The device comprises a central control unit controlling the opening and closing of the automatic coupling mechanism. This ensures fully automated actuation of the device;

In an alternative form of the invention, the extruder delivers into the nip formed between a first calendering roller and a second calendering roller which are able to rotate and made to rotate in opposite directions about axes that are mutually parallel and perpendicular to the longitudinal axis of the barrel. These rollers are advantageously mounted on the die support which is fixed.

The object of the invention is also achieved with a method for cleaning an extruder intended to operate with elastomer mixtures comprising a frame supporting a screw and a barrel, the screw being made to rotate in the barrel when rotationally driven about the longitudinal axis of the barrel by drive means, the barrel comprising an elastomer-mixture feed inlet and an outlet opening into an extrusion die mounted on a support, the method comprising the following steps:

unlocking the barrel with respect to the die using an automatic coupling mechanism that allows the barrel and the die to be locked and unlocked quickly along a parting line that is substantially axisymmetric with respect to the axis X-X', moving the frame translationally with respect to the die support in a direction parallel to the longitudinal axis between a first position in which the barrel and the die are in sealed contact to allow the elastomer mixture to pass through the die and a second position in which the barrel is moved away from the die to allow cleaning, rotating the screw in order to empty the extruder.

According to other advantageous features of the invention:

the rotating of the screw when the frame is in the second position is performed in the same direction as the rotating of the screw when the framework is in the first position, which allows the residual mixture located at the downstream end of the extruder to be emptied;

the translational movement of the frame is over a distance at least equal to the distance between the downstream end of the screw and that of the die, making it possible to completely clear the residual mixture from the die;

the die has a convergent shape so as to prevent mixture from becoming stuck as the result of an undercut shape;

the barrel comprises claws that catch on the elastomeric mixture; these claws, which are active when the frame is moved between the two positions, allow the residual mixture to be carried away as the extruder as a whole moves;

in an alternative form of embodiment of the invention, the die of the extruder delivers into the nip formed between a first calendering roller and a second calendering roller. When the frame is moved away into the second position, the said first and second rollers are turned in order to remove the mixture remaining between the die and these rollers.

BRIEF DESCRIPTION OF THE DRAWINGS

The invention will be understood better from studying the attached FIGS. 1 to 5 which are provided by way of examples and are in no way limiting, in which:

FIGS. 2a to 2d depict, in schematic views in cross section, the various steps in the method for cleaning an extruder according to the invention.

DETAILED DESCRIPTION OF EMBODIMENTS OF THE INVENTION

Figure 1:
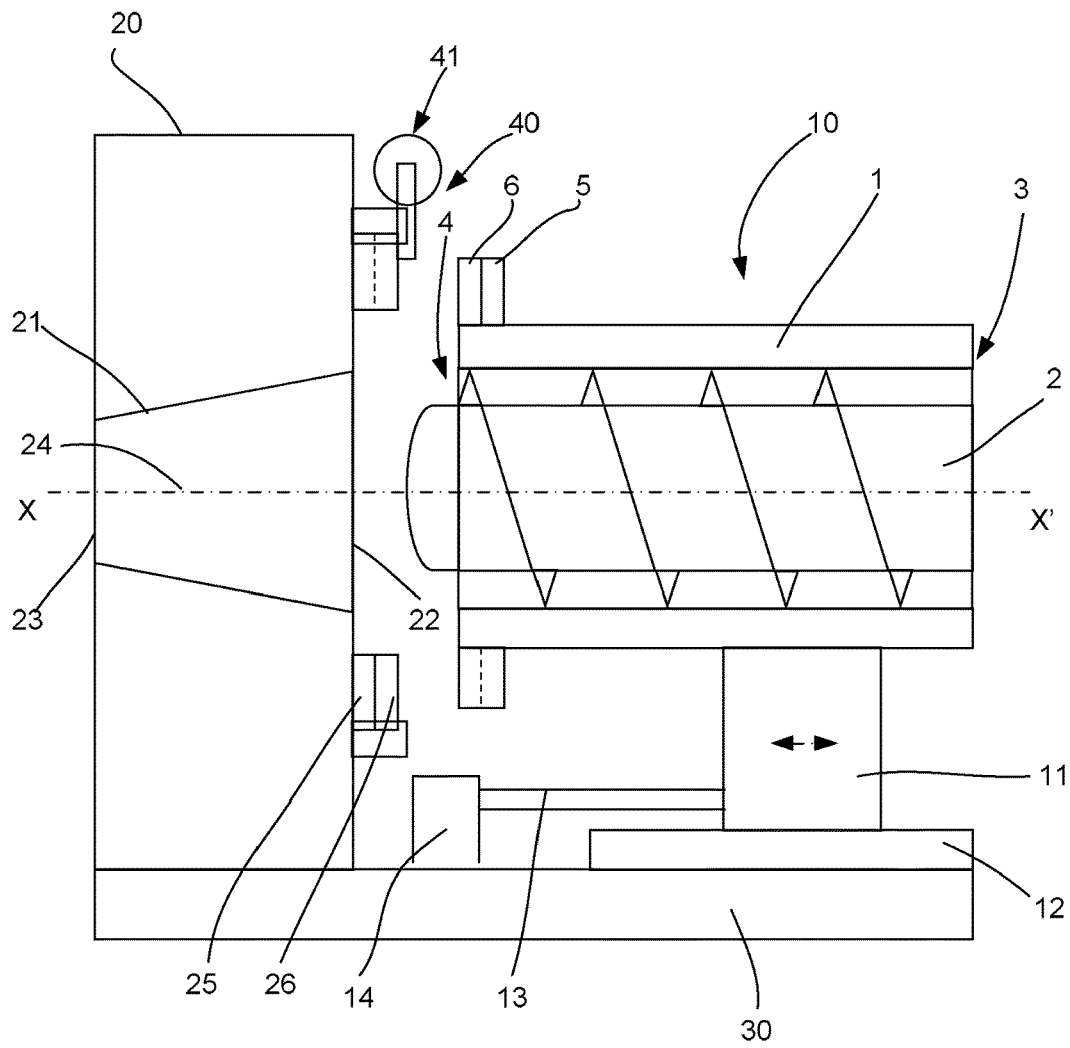
FIG. 1 depicts a schematic overview in axial section of a device for cleaning an extruder according to the invention.
Figure 5:
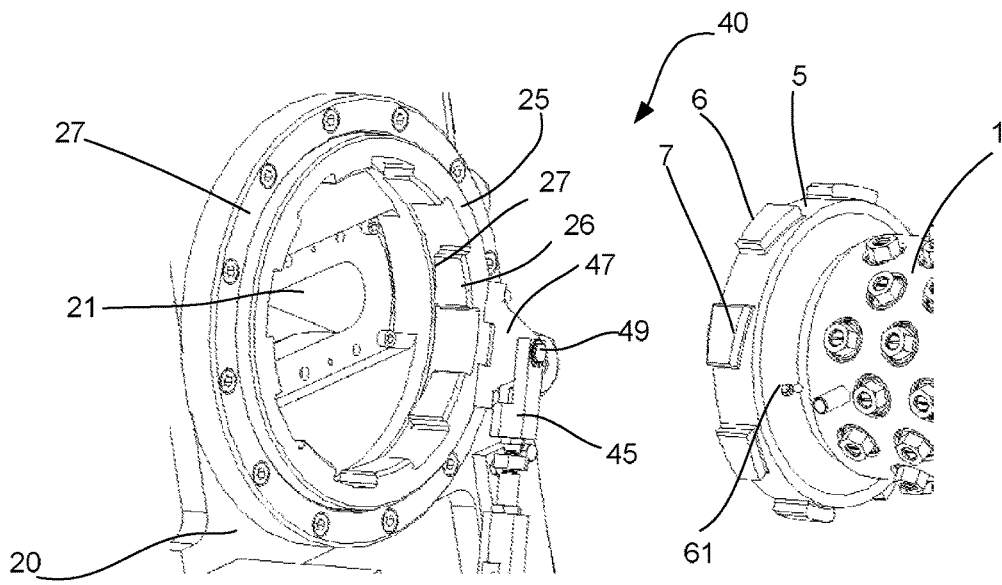
FIG. 5 is a perspective view of part of the automatic coupling mechanism of the device of the invention, the extruder and the die support being situated distant from one another.

The device for cleaning an extruder intended to operate with elastomeric mixtures is depicted in FIG. 1 and comprises a bed 30 on which there are mounted an assembly forming an extruder 10 and a support 20 for a die 21. The assembly forming an extruder 10 comprises a cylindrical screw 2 which rotates inside a barrel 1 and the means (not visible in the drawing) for driving the screw, such as an electric motor and reduction gearbox arranged at the upstream end thereof. The screw 2 rotates inside the barrel 1 about the longitudinal axis X-X' thereof. The barrel 1 has a cylindrical overall shape and comprises, upstream, an elastomeric-material feed inlet 3 and, downstream, an outlet 4 towards a die through which the elastomeric mixture propelled by the screw 2 passes. It will be recalled that upstream and downstream mean as seen in the direction of flow of the material between the feed inlet to the barrel and the outlet via the die 21.

The support 20 is secured to the bed 30 and comprises a through-orifice 24 the axis of symmetry of which is aligned with the longitudinal axis X-X' of the barrel 1, in the continuation thereof. The die 21 is mounted using fixing screws in the through-orifice 24 of the support 20 so that it is centred on the axis of the latter. The die 21 has a flattened overall shape (the cross section being of elliptical overall shape) and is convergent, as seen in axial section, between an upstream end 22 situated facing the outlet 4 of the barrel 1 and a downstream end 23 via which a profiled element exits. In operation, the mixture propelled by the screw 2 exits in the form of a profiled element through the die 21 and is transferred for example via a conveyor to a storage reel onto which it is wound.

In an alternative form of the invention, the die 21 delivers into the nip formed between a first calendering roller and a second calendering roller the horizontal axes of which are mutually parallel and perpendicular to the longitudinal axis X-X', the two rollers (not depicted in the drawings) being rotationally driven in opposite directions about their respective axes. The rollers are mounted with their respective drive systems on the support 20 at the exit from the die 21. The two rollers form a roller-die system the purpose of which is to profile the elastomeric mixture exiting via the die 21 into the form of a strip. The profiled element thus obtained is then wound onto a storage reel or may be laid directly onto a building drum adjacent to one of the rollers.

According to the invention, the assembly forming an extruder 10 is mounted on a mobile frame 11, the frame being able to move translationally in a direction parallel to the longitudinal axis X-X' of the barrel 1 as indicated by the double arrow in FIG. 1. The frame 11 for this purpose comprises guide tabs 12 which are made to slide along a fixed rail (not visible in the drawings) belonging to the bed 30. The frame 11 is able to move under the action of the rod 13 of an electric actuating cylinder 14 mounted on the bed 30. The extruder 10 is thus moved axially with respect to an extrusion die 21 mounted fixedly on a support 20 so as to separate and then bring together the two parts along a parting line that is axisymmetric with respect to the axis X-X'. The frontal part of the barrel 1 of the extruder is thus pressed firmly without play against the facing frontal part of the die 21 and held in position by an automatic coupling mechanism.

The device for cleaning the extruder according to the invention for this purpose comprises an automatic coupling mechanism 40 allowing the barrel 1 to be locked and unlocked quickly with respect to the die 21 so that these can be brought into sealed communication and then separated easily. The automatic coupling mechanism 40 comprises two rings 5, 25 each provided with fixing tenons 6, 26 and a latch lock lever rotational drive mechanism 41 for driving one ring with respect to the other. More particularly, a first ring 5 is fixedly mounted on the barrel 1 and arranged in such a way as to surround the outlet end 4 thereof, and a second ring 25 is mounted with the ability to rotate on the side of the support 20 that faces the barrel 1, the two rings 5, 25 are coaxial being arranged along the axis X-X'. The ring 25 is held by an annular support 27 inside which it is made to turn, the annular support 27 being secured to the support 20. The first ring 5 comprises tenons 6 which at their upstream end exhibit inclined ramps 7 which are made to collaborate with the inclined ramps 27 situated at the downstream end of the tenons 26 of the second ring. The inclined ramps 7 and 27 follow a helical curve which, in one preferred embodiment of the invention has an angle of inclination of around 10° so as to be reversible and to leave the friction cone of the friction between the two components. The tenons 6, 26 thus represent the threads of the automatic coupling mechanism 40 of the screw nut type.

The number of tenons needs to be at least two in order to distribute the closure force over the circumference of the ring, the number of tenons increasing with the diameter of the ring and the axial force reacted by the tenons. Moreover, it is found that the lower the number of tenons, the higher the angle through which the ring 25 has to rotate in order to unlock/lock, the longer the latch lock lever links need to be and, therefore, the longer the travel of the actuating cylinder needs also to be. The solution of the invention makes it possible to take all of these considerations into account and to provide an automatic coupling mechanism that is small in bulk but at the same time allows for effective closure, without the risk of the mixture leaking from the interface between the two components. In the example illustrated, the ring 25 comprises eight tenons, which corresponds to the number of threads of the automatic coupling mechanism 40, for a ring diameter of around 180 mm.

The tenons 6 and 26 are uniformly distributed on the circumference of each ring 5 and 25 and are produced in such a way that the tenons 6 of one ring 5 can slide axially in the spaces between the tenons 26 of the other ring 25 opposite when the barrel 1 and the die 21 are in the unlocking position.

Figure 3:
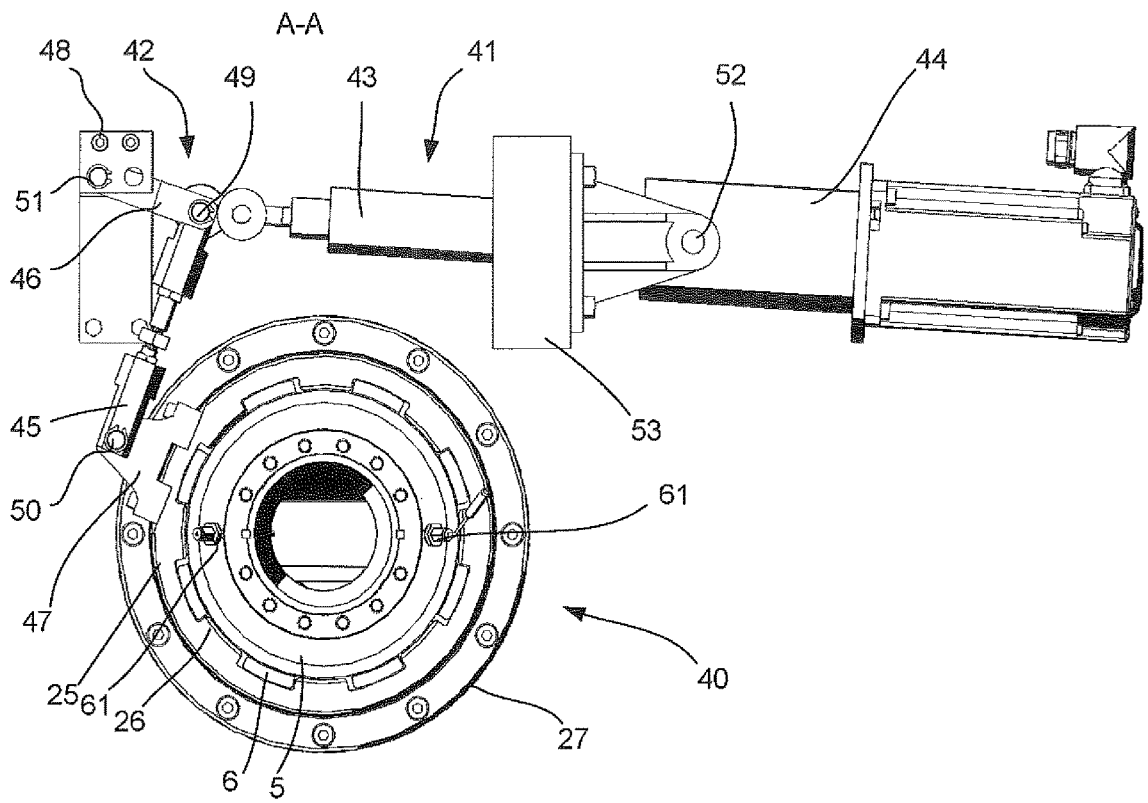
FIG. 3 is a view in cross section on the plane A-A of FIG. 2d of the device of the invention when the locking device is in the unlocked position.
Figure 4:
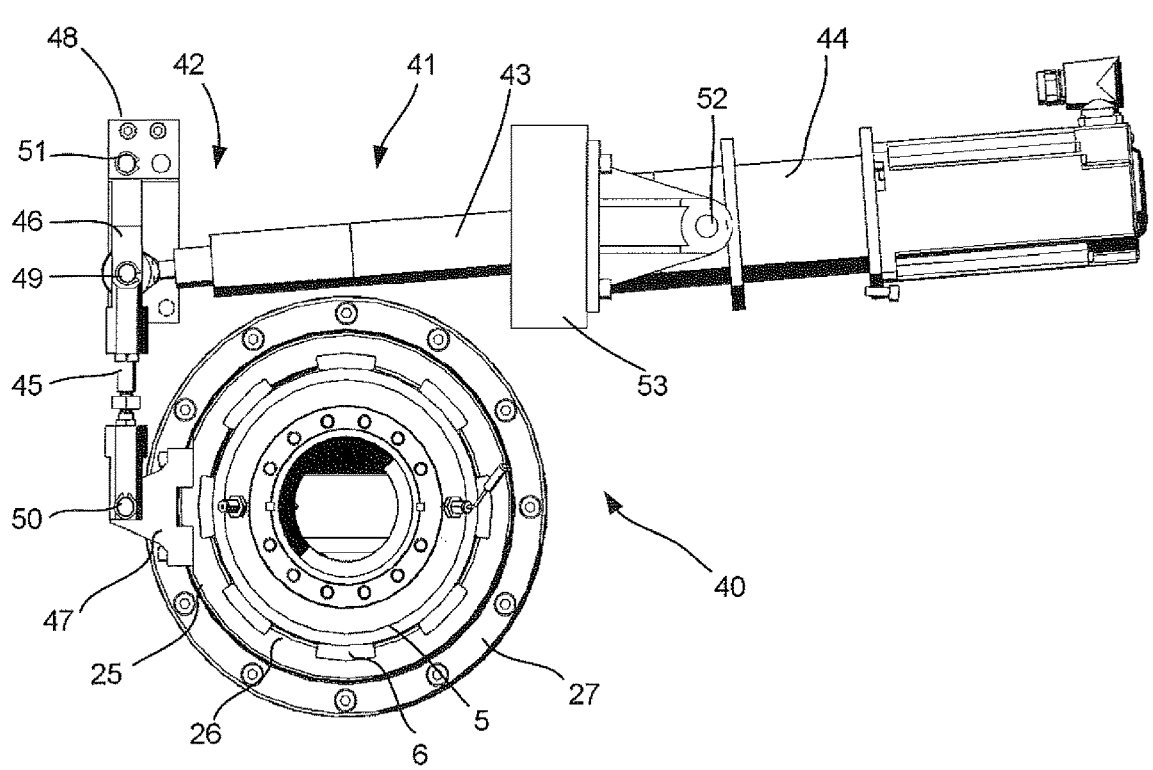
FIG. 4 is a view in cross section on the plane A-A of FIG. 2d of the device of the invention when the locking device is in the locked position.

The mechanism 41 for rotationally driving the ring 25 comprises a latch lock lever device 42 with a pushrod which is the rod 43 of an electric actuating cylinder 44 as can best be seen in FIGS. 3 and 4. More particularly, the latch lock lever device 42 comprises two links 45 and 46 which are mounted in such a way as to pivot at a common articulation 49 the axis of which is parallel to the axis X-X'. A first link 45 is mounted via a pivot 50 and a flange 47 on the frontal face of the ring 25, while the second link 46 is mounted via a pivot 51 and an upright 48 on the support 20, the axes of the pivots 50, 51 also being parallel to the axis X-X'. During operation, when the actuating cylinder is commanded for closure, its rod 43 lengthens and applies pressure to the articulation 49 of the latch lock lever device 42 which makes the ring 26 rotate with respect to the ring 5 which is fixed and causes the locking device of the automatic coupling mechanism 40 to pass from the open position illustrated in FIG. 3 to the closed one illustrated in FIG. 4. When the actuating cylinder 44 is actuated in the opposite direction, the rod 43 thereof applies a pulling force to the articulation 49 and this unlocks the two rings 5 and 25 from one another, the ramps of the tenons 26 of the ring 25 then finding themselves beside the ramps of the tenons 6 of the ring 5. The body of the actuating cylinder 44 is mounted with the ability to pivot about a hinge 52 of an upright 53 fixed to the support 20. The use of a latch lock lever device offers the advantage that the force applied to the link 45 by the actuating cylinder 44 is low by comparison with the clamping force ultimately applied to the ring 25.

The operation of the cleaning device according to the invention will be explained hereinafter with reference to FIGS. 2a to 2d and to the steps of the method of the invention.

FIG. 2a illustrates the extruder cleaning device of the invention at the end of the extrusion operation when the screw of the extruder has stopped so that the extruder can be emptied. The actuating cylinder 44 of the automatic coupling mechanism 40 receives a command (coming from a central control unit or from a command and control controller) to unlock the rings 25 and 5 when the tenons 6 come to face the spaces provided between the tenons 26 so as to be able to release the barrel 1. The command is then given to the actuating cylinder 14 to move the mobile frame 11 in the direction of the arrow illustrated in FIG. 2a.

FIG. 2b illustrates the extruder 10 in its position away from the support 20 and therefore from the die 21. The residual mixture 60 that was initially between the downstream end of the screw 2 and the die 21 remains caught on the screw and a distance away from the die. In an alternative form, claws for catching on the mixture are provided to make sure that it remains completely attached to the screw. The claws 61 are placed on the ring 5 at the exit from the barrel 1. One or several claws are provided these remaining permanently attached to the barrel 1 and passing through the thickness thereof in order to penetrate the residual mixture 60. In one alternative form of the invention, the claws 61 act as an insert in which to house a mixture pressure or temperature sensor. The claws are dimensioned in such a way as to be long enough that they do not release the residual mixture 60 as the latter deforms as a result of the movement of the extruder. In an alternative form, the shape of the outlet orifice of the barrel 1, or that of the ring 5, is non-circular; it is produced in such a way as to act as a claw in order to hold back the residual mixture when the shape of the die includes an undercut.

Starting from the position illustrated in FIG. 2b, the screw begins to be turned in order to completely remove the mixture remaining inside the extruder, which mixture then drops under gravity (in the direction of the arrow in FIG. 2c) and is collected in a container (not illustrated) underneath. When rollers are provided at the downstream exit of the die, these are also turned in rotation in this step in order to remove the mixture remaining between the rollers and the die.

FIG. 2d illustrates the step that completes the cleaning operation, the extruder 10 being completely emptied and the automatic coupling mechanism 40 being in the locking position. The extruder 10 is operational again and ready to receive a new mixture of elastomers, because the barrel 1 is in sealed contact with the support 20 and therefore the die 21.

Other alternative forms and embodiments of the invention may be envisaged without departing from the scope of these claims. Thus it is possible to envisage replacing the tenons with a continuous screw thread produced in each of the rings.

The invention claimed is:

1. A device comprising:
   a frame;
   a barrel supported by the frame, the barrel having a longitudinal axis X-X' and including an elastomeric-mixture feed inlet and an outlet that opens directly into an extrusion die mounted on a support;
   a screw supported by the frame, the screw being rotatable about the axis X-X' when the screw is rotationally driven by a driver; and
   an automatic coupling mechanism,
   wherein the frame is movably mounted to slide along a fixed guiding rail, such that the frame is translationally movable along the rail with respect to the die and the support in a direction parallel to the axis X-X' between (1) a first position, in which the barrel and the die are in sealed contact with each other in order to allow the elastomeric mixture to pass through the die, and (2) a second position, in which the barrel is moved away from the die in order to allow cleaning to be performed,
   wherein a parting line between the barrel and the die is axisymmetric with respect to the axis X-X',
   wherein the automatic coupling mechanism enables a locking and a unlocking of the barrel and the die, to allow the frame to move between the first and second positions when the barrel and the die are unlocked,
   wherein the automatic coupling mechanism comprises a screw-nut system that includes (a) a first ring surrounding the barrel, (b) a second ring secured to the support and surrounding the die, the second ring being structured to collaborate with the first ring, and (c) a rotational driver for causing relative rotational turning between the first and second rings, wherein the first ring comprises a plurality of inclined ramps, wherein the second ring comprises a plurality of inclined ramps, wherein the screw-nut system is configured such that when the barrel and the die are locked, (a) the first ring is radially within the second ring and (b) surfaces of the inclined ramps of the first ring bear on surfaces of the inclined ramps of the second ring, wherein the inclined ramps of the first ring are first tenons that are uniformly distributed along a circumference of the first ring, wherein the inclined ramps of the second ring are second tenons that are uniformly distributed along a circumference of the second ring, wherein the first tenons of the first ring are structured to be axially slidable in spaces between the second tenons of the second ring when the automatic coupling mechanism is in an unlocked state, wherein the second ring is rotatably secured to the support, wherein the rotational driver comprises a latch-lock lever device that connects the second ring in an articulated manner to a rod of a translational-actuation actuating cylinder, wherein the actuating cylinder is mounted so as to be pivotable about a hinge attached to the support, wherein the latch-lock lever device comprises (1) a first link coupled via a pivot and a flange to the second ring, the pivot having an axis parallel to the axis X-X' and (2) a second link coupled via a pivot to the support, the pivot having an axis parallel to the axis X-X', wherein the first link and the second link are arranged to pivot at a common articulation whose axis is parallel to the axis X-X', wherein when the actuating cylinder is driven to extend the rod, the rod applies pressure to the articulation which causes the second ring to rotate with respect to the support and with respect to the first ring, thereby causing the automatic coupling mechanism to lock, and wherein when the actuating cylinder is driven to retract the rod, the rod applies a pulling force to the articulation which causes the second ring to rotate with respect to the support and with respect to the first ring, thereby causing the automatic coupling mechanism to unlock.

2. The device according to claim 1, wherein the automatic coupling mechanism is structured to produce locking forces that are distributed uniformly over a circumference of the barrel.

3. The device according to claim 1, wherein the first and second rings are coaxial, and wherein the second ring is secured to an outlet end of the barrel.

4. The device according to claim 1, further comprising a central control unit that controls opening and closing actions of the automatic coupling mechanism by sending a command to the actuating cylinder.

5. The device according to claim 1, wherein the inclined ramps of the first ring number at least eight, and wherein the inclined ramps of the second ring number at least eight.

6. The device according to claim 1, wherein each of the inclined ramps of the first ring tapers in a circumferential direction of the first ring.

7. The device according to claim 6, wherein each of the inclined ramps of the second ring tapers in a circumferential direction of the second ring.

8. A device comprising:

a frame;

a barrel supported by the frame, the barrel having a longitudinal axis X-X' and including an elastomeric-mixture feed inlet and an outlet that opens directly into an extrusion die mounted on a support;

a screw supported by the frame, the screw being rotatable about the axis X-X' when the screw is rotationally driven by a driver; and an automatic coupling mechanism, wherein the frame is movably mounted such that the frame is translationally movable with respect to the die and the support in a direction parallel to the axis X-X' between (1) a first position, in which the barrel and the die are in sealed contact with each other in order to allow the elastomeric mixture to pass through the die, and (2) a second position, in which the barrel is moved away from the die in order to allow cleaning to be performed, wherein a parting line between the barrel and the die is axisymmetric with respect to the axis X-X', wherein the automatic coupling mechanism enables a locking and a unlocking of the barrel and the die, to allow the frame to move between the first and second positions when the barrel and the die are unlocked, wherein the device acts against release of residue of the elastomeric mixture from the screw when the frame is moved from the first position toward the second position in that the device further comprises a claw fixedly attached to the first ring at an exit from the barrel, the claw acting against the release of the residue of the elastomeric mixture from the screw when the frame is moved from the first position toward the second position, and wherein the claw passes through a thickness of a wall of the barrel so as to extend into the interior of the barrel and to penetrate the residue of the elastomeric mixture in the barrel, and wherein the claw comprises a temperature sensor.

9. The device according to claim 8, wherein the residue of the elastomeric mixture comprises material that was initially between a downstream end of the screw and the extrusion die.

10. The device according to claim 8, wherein more than one of the claw is provided.

11. A device comprising:

a frame;

a barrel supported by the frame, the barrel having a longitudinal axis X-X' and including an elastomeric-mixture feed inlet and an outlet that opens directly into an extrusion die mounted on a support;

a screw supported by the frame, the screw being rotatable about the axis X-X' when the screw is rotationally driven by a driver; and an automatic coupling mechanism, wherein the frame is movably mounted such that the frame is translationally movable with respect to the die and the support in a direction parallel to the axis X-X' between (1) a first position, in which the barrel and the die are in sealed contact with each other in order to allow the elastomeric mixture to pass through the die, and (2) a second position, in which the barrel is moved away from the die in order to allow cleaning to be performed, wherein a parting line between the barrel and the die is axisymmetric with respect to the axis X-X', wherein the automatic coupling mechanism enables a locking and a unlocking of the barrel and the die, to allow the frame to move between the first and second positions when the barrel and the die are unlocked, wherein the device acts against release of residue of the elastomeric mixture from the screw when the frame is moved from the first position toward the second position in that the device further comprises a claw fixedly attached to the first ring at an exit from the barrel, the claw acting against the release of the residue of the elastomeric mixture from the screw when the frame is moved from the first position toward the second position, and wherein the claw passes through a thickness of a wall of the barrel so as to extend into the interior of the barrel and to penetrate the residue of the elastomeric mixture in the barrel, and wherein the claw comprises a pressure sensor.

* * * * *